United States Patent [19]
Denenberg

[11] 3,937,899
[45] Feb. 10, 1976

[54] TONE DETECTOR USING SPECTRUM PARAMETER ESTIMATION

[75] Inventor: Jeffrey Neil Denenberg, Naperville, Ill.

[73] Assignee: Bell Telephone Laboratories, Incorporated, Murray Hill, N.J.

[22] Filed: Jan. 30, 1975

[21] Appl. No.: 545,410

[52] U.S. Cl. ............................ 179/84 VF; 328/138
[51] Int. Cl.² ......................................... H04M 1/50
[58] Field of Search ............... 179/84 VF; 328/138; 343/100 CL

[56] References Cited
UNITED STATES PATENTS

| | | | |
|---|---|---|---|
| 3,652,805 | 3/1972 | Wisner | 179/84 VF |
| 3,882,283 | 5/1975 | Proudfoot | 179/84 VF |

OTHER PUBLICATIONS
J. N. Denenberg and L. G. Peach, "Estimation of Spectral Moments", Proceedings Ninth Annual Allerton Conference on Circuit & System Theory, Oct. 6–8, 1971, p. 1085.

*Primary Examiner*—William C. Cooper
*Assistant Examiner*—Joseph Popek
*Attorney, Agent, or Firm*—J. C. Albrecht

[57] ABSTRACT

A tone detector circuit for detecting the presence of a certain tone or tones in an input signal. An estimate is calculated for each of the following three parameters of the band limited spectrum of the input signal: total power, power mean frequency, and mean square power bandwidth. Each of the three input spectrum parameters is compared to the same parameter of the tone or tones desired to be detected. If a match within certain bounds occurs on all three parameters, the desired signal has been detected.

9 Claims, 7 Drawing Figures

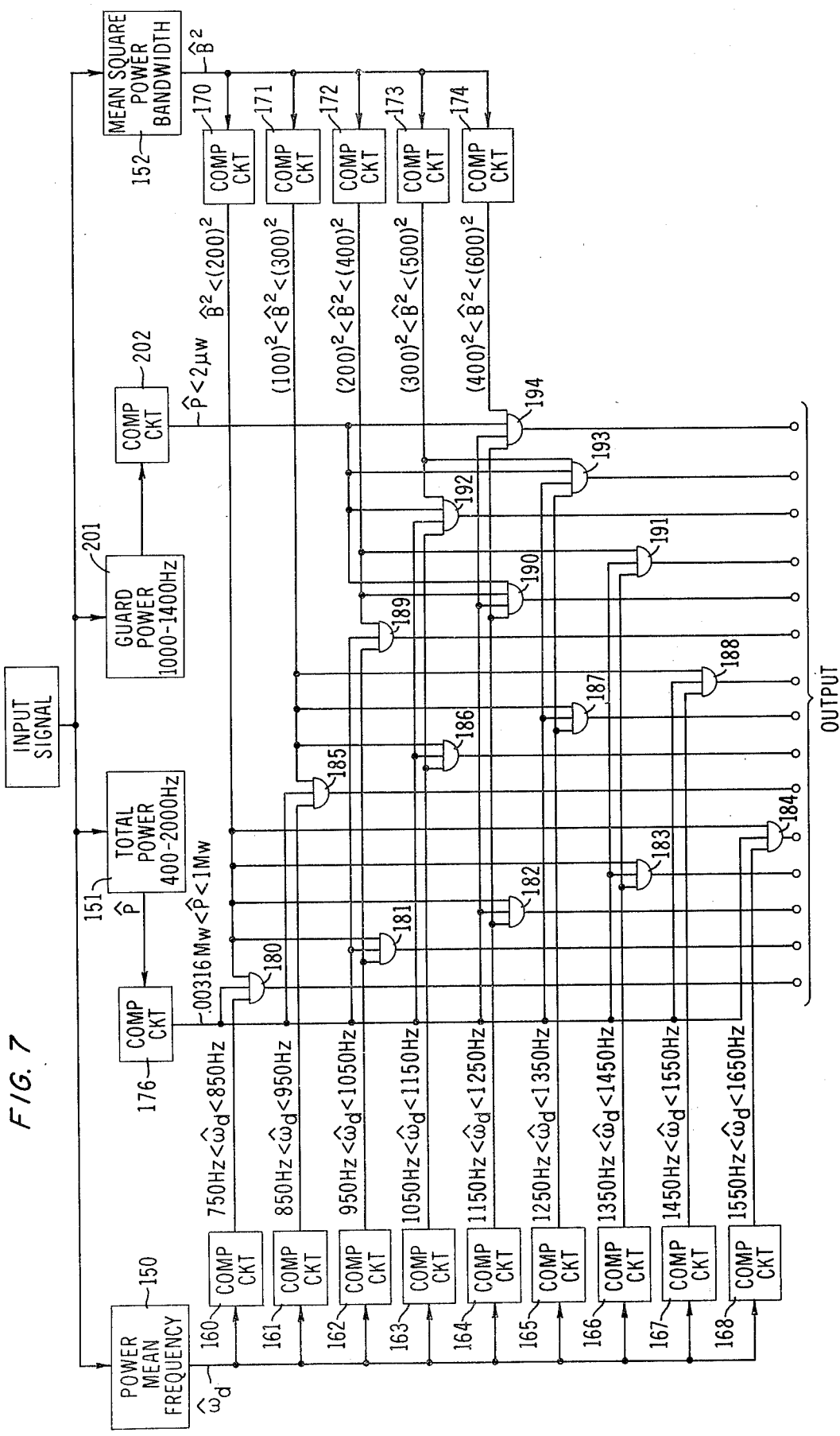

TONE DETECTOR USING SPECTRUM PARAMETER ESTIMATION

BACKGROUND OF THE INVENTION

This invention relates to tone signals, and particularly to the detection of certain tone signals.

In communication systems, voice band signals or tones are used to transmit data or supervisory information, for example, TOUCH-TONE, audible ring, busy, etc. Tone signals may comprise either single tones or mutliple tones. Prior tone detectors have utilized filter circuits which select the frequency component or components of interest by means of very narrow band pass filters and power measuring circuits to measure the power in the neighborhood of the selected frequency. In such prior art circuits a filter circuit is required for each tone component. This invention, however, can detect signals of either type using a single set of estimator circuits and one or more sets of decision circuits depending on the particular application.

Prior tone detectors indicate the presence of a tone whenever a signal of the desired frequency and power is present, regardless of the rest of the frequency spectrum characteristics and, therefore, often require additional circuitry to avodi generating erroneous outputs. This invention detects the presence of a desired signal based on the characteristics of the entire bandpass spectrum of the detector and, therefore, can reject many erroneous signals without additional circuitry.

This invention may be advantageously implemented using large scale integration since no inductors are required for either an analog or digital implementation.

SUMMARY OF THE INVENTION

In accordance with the present invention, a circuit for detecting the presence or absence of certain tones comprises a number of estimator circuits for estimating certain parameters of an input signal. There are one or more decision circuits, each corresponding to a tone whose presence is to be detected. Each decision circuit compares each of the estimated parameters of the input signal to corresponding parameters of the signal to be detected and indicates the presence of the signal to be detected only when all of the estimated parameters of the input signal are substantially equal to the parameters of the signal to be detected.

BRIEF DESCRIPTION OF THE DRAWING

A tone detector circuit according to this invention will be better understood from a consideration of the following accompanying drawing in which:

FIG. 7 is a multi-frequency detector circuit according to the invention.

DETAILED DESCRIPTION

Figure 1:
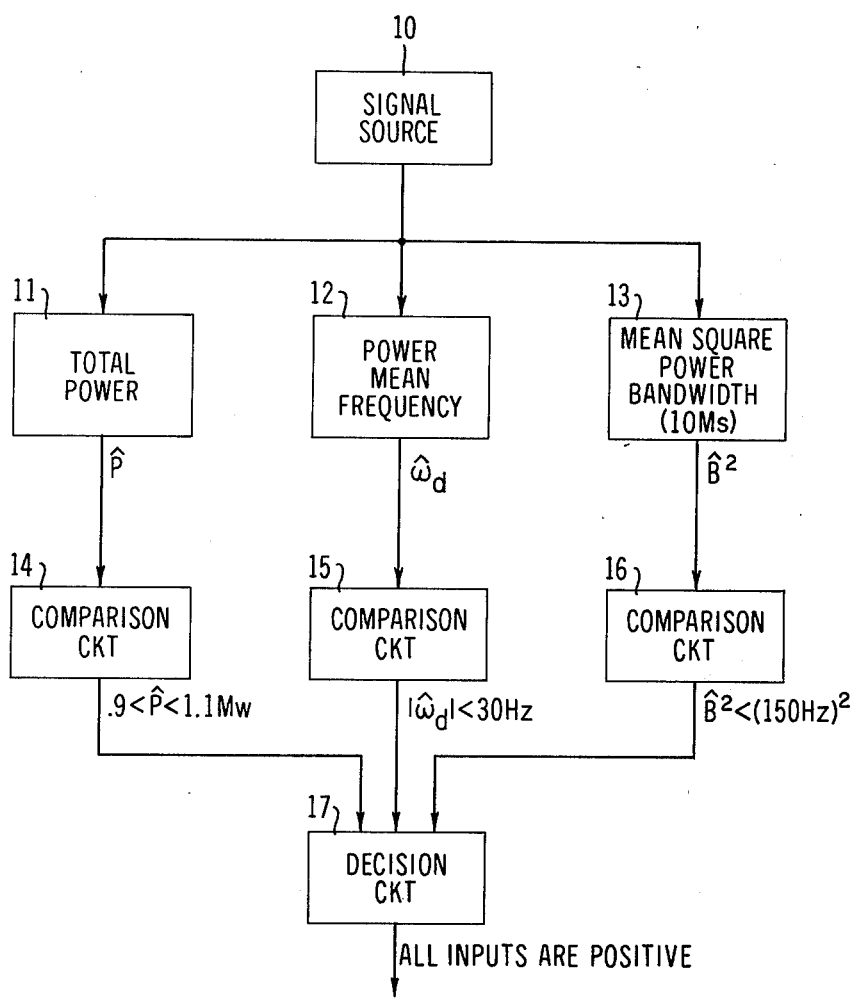
FIG. 1 depicts an exemplary tone detector circuit according to this invention in block diagram form.

One illustrative tone detector according to this invention is shown in FIG. 1 for detecting the presence of one or more tones from signal source 10 and comprises a total power estimator circuit 11, a power mean frequency estimator circuit 12, and a mean square power bandwidth estimator circuit 13, each of the estimator circuit 11, 12, 1nd 13 having an input connected to signal source 10. The output of the total power estimation circuit 11 is connected to the input of a comparison circuit 14 which is constructed such that its output indicates whether or not the power estimation of the input signal is within certain limits determined by the power of the desired signal, for example, between 0.9 and 1.1 milliwatts for a typical telephone tone signal. The output of the power mean frequency estimator circuit 12 is connected to the input of a comparison circuit 15 which is constructed to compare the estimated power mean frequency of the input signal to the power mean frequency of a desired signal, for example, a frequency within the audio bandpass of a telephone transmission circuit. The output of comparison circuit 15 indicates whether or not the estimated power means frequency of the input signal is within a certain tolerance, for example, 30 hertz of the power mean frequency of the desired signal. The output of the mean square power bandwidth estimator circuit 13 is connected to the input of a comparison circuit 16 which is constructed such that its output indicates whether or not the estimated means square power bandwidth of an input signal is within limits determined by the desired signal, the noise present, and the time interval over which the estimation circuit 13 calculates the bandwidth estimate, for example, 10 milliseconds for a typical telephone tone signal. For a typical single tone signal, the mean square power bandwidth required would be less than $(150 \text{ hertz})^2$. The outputs of comparison circuits 14, 15, and 16 are connected to corresponding inputs of a decision circuit 17 whose output indicates whether or not the comparison circuits all indicate the estimates to be within the required limits.

A tone detector circuti such as is illustrated in FIG. 1 may be implemented using either digital or analog techniques. The exemplary digital circuit implementation is described in more detail in FIG. 2; however, the principal of the invention extends to both digital and analog implementations.

Figure 2:
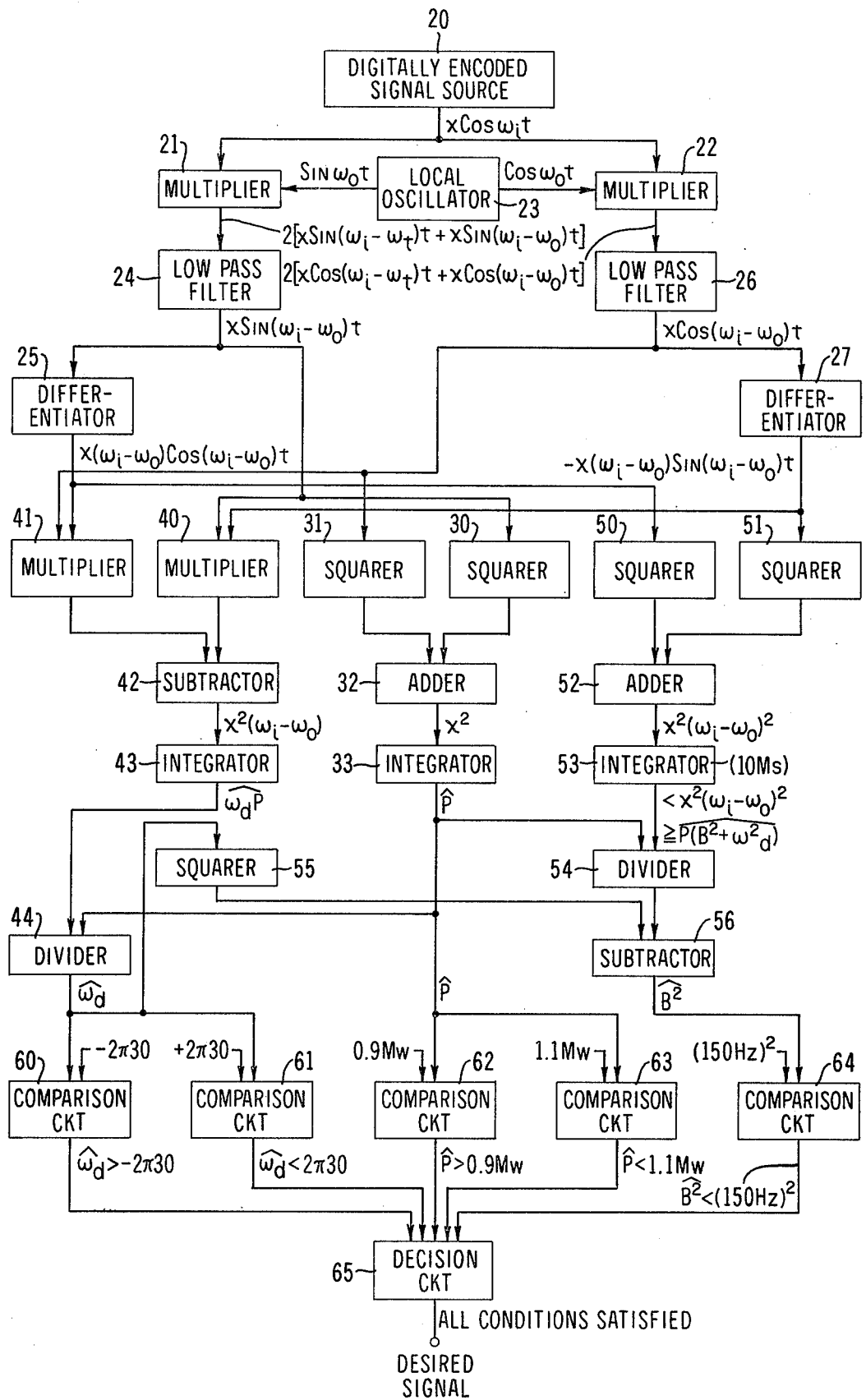
FIG. 2 depicts a tone detector circuit according to this invention in detailed diagram form showing the signals present at each point in the circuit.

One illustrative digital tone detector according to this invention is shown in FIG. 2 as a circuit for detecting tones from a digitally encoded signal source 20 and comprises digital multipliers 21 and 22. A digital multiplier comprises two inputs and an output. Digitally encoded numbers present on the two inputs are mathematically multiplied and their product is present on the output. An example of a digital multiplier of the same general type envisioned for use in this invention is described by Montogomery Phister, Jr., *Logical Design of Digital Computers*, pages 295–314. An input signal from signal source 20 is represented as a sinusoidal signal of the form $x \cos \omega_i t$ where $x$ is the ampltiude of the input signal, $\omega_i$ is the frequency of the input signal in radians per second, i.e., $\omega = 2\pi f$ where $f$ is the frequency in hertz, and $t$ represents the time varying nature of the input signal. Multiplier 21 multiplies the input signal by a signal of the form $\sin \omega_o t$ where $\omega_o$ is a reference frequency equal to the mean frequency of the desired signal. The signal $\sin \omega_o t$ is generated by a local oscillator 23. For purposes of illustration, a digital oscillator comprises a memory used to store the value of $\sin \omega_o t$ for each of a series of time increments. The product of $x \cos \omega_i t$ and $\sin \omega_o t$ is a signal having components representing both the sum and difference of the two frequencies as follows:

$$2(x \sin(\omega_i - \omega_o)t + x \sin(\omega_i + \omega_o)t) \qquad (1)$$

The output of mutliplier 21 is connected to the input of a low pass filter 24 whose bandpass characteristic is arranged such that the signal component corresponding to the sum of $\omega_i$ and $\omega_o$ is removed, leaving:

$$x \sin(\omega_i - \omega_o)t \qquad (2)$$

A digital low pass filter comprises an input for receiving a digitally encoded input signal and an output for providing a signal corresponding to only those components of the input signal having a frequcny less than a certain cutoff frequency. For example, a digital low pass filter of the same general type contemplated for use in this invention is described in Leon and Bass, "Designers' Guide to: Digital Filters", EDN, Jan. 20, 1974; May 20, 1974; June 20, 1974. The output of low pass filter 24 is connected to the input of differentiator 25 which calculates the first derivative of the input signal 2 which is:

$$x(\omega_i - \omega_o) \cos(\omega_i - \omega_o)t \qquad (3)$$

A differentiator circuit may be constructed from a low pass filter circuit having certain predefined characteristics. Local oscillator 23 is arranged to generate a signal corresponding to $\cos \omega_o t$ as well as $\sin \omega_o t$. An exemplary implementation comprises a read only memory digital oscillator having two words stored in a read only memory for each time interval, one corresponding to $\sin \omega_o t$ and one corresponding to $\cos \omega_o t$. The $\cos \omega_o t$ output of local oscillator 23 is connected to an input of a multiplier 22 and the input signal $x \cos \omega_i t$ is connected to another input of multiplier 22, resulting in a signal at the output of multiplier 22 having components corresponding to both the sum and difference of the two frequencies $\omega_o$ and $\omega_i$ as follows:

$$2(x \cos(\omega_i - \omega_o)t + x \cos(\omega_i + \omega_o)t) \qquad (4)$$

The output of multiplier 22 is connected to the input of a low pass filter 26 which is constructed such that the signal component corresponding to the sum of the two frequencies is removed, yielding the following signal at the output of low pass filter 26:

$$x \cos(\omega_i - \omega_o)t \qquad (5)$$

The output of low pass filter 26 is connected to the input of a differentiator 27 which calculates the first derivative of its input signal, resulting in the following signal at the output of differentiator 27:

$$-x(\omega_i - \omega_o) \sin(\omega_i - \omega_o)t \qquad (6)$$

The output of low pass filter 24 is connected to the input of a mathematical squarer circuit 30 which calculates the square of the input signal as follows:

$$x^2 \sin^2(\omega_i - \omega_o)t \qquad (7)$$

A mathematical squarer circuit for purpose of illustration comprises a digital multiplier circuit wherein the same input signals are applied to both inputs of the multiplier circuit. The output of low pass filter 26 is connected to the input of such a mathematical squarer circuit 31 yielding at its output:

$$x^2 \cos^2(\omega_i - \omega_o)t \qquad (8)$$

The outputs of mathematical squarer circuits 30 and 31 are connected to inputs of an adder circuit 32, yielding at its output the square of the input signal amplitude, $x^2$, which corresponds to the instantaneous power of the input signal. A digital adder circuit comprises two inputs for receiving digitally encoded input signals and an output for providing a signal corresponding to a digitally encoded number equal to the mathematical sum of the numbers represented by the signals presnet on the two inputs. An example of a digital adder circuit of the same general type contemplated for use in this invention is shown in Montgomery Phister, Jr., *Logical Design of Digital Computers*, pages 253–275. The output of adder 32 is connected to the input of an integrator circuit 33 which performs the function of averaging the instantaneous power $x^2$ over a period of time to yield an estimate of the total power of the input signal $\hat{P}$ where the symbol ^ indicates an estimate of the quantity under it. An integrator circuit comprises an input upon which a time varying signal is present and an output for presenting a signal corresponding to an average of the input signal over a certain period of time. An example of a numerical integration algorithm is shown in james Singer, *Elements of Numerical Analysis*, pages 259–293.

The outputs of low pass fitler 24 and differentiator 27 are connected to inputs of a multiplier 40 which yields at the output of multiplier 40:

$$-x^2(\omega_i - \omega_o) \sin^2(\omega_i - \omega_o)t \qquad (9)$$

The outputs of differentiator 25 and low pass filter 26 are connected to inputs of a multiplier 41 yielding the following signal at the output of multiplier 41:

$$x^2(\omega_i - \omega_o) \cos^2(\omega_i - \omega_o)t \qquad (10)$$

The outputs of multipliers 40 and 41 are connected to inputs of a subtractor 42 whose output corresponds to the power frequency product $x^2(\omega_i - \omega_o)$. A digital subtractor circuit comprises a minuend input and a subtrahend input for receiving digitally encoded input signals and an output for providing a signal corresponding to a digitally encoded number equal to the number present on the minuend input minus the number present on the subtrahend input. The output of subtractor 42 is connected to the input of integrator 43 in order to calculate the average power frequency product over a certain period of time yielding an estimate of the power frequency product $\hat{P\omega_d}$, where $\omega_d$ is the power mean frequency relative to the reference frequency $\omega_o$. The output of integrator 43 is connected to the dividend input of a divider 44, and the output of integrator 33 is connected to the divisor input of divider 44. A divider circuit comprises a dividend input for receiving a first digitally encoded input signal, a divisor input for receiving a second digitally encoded input signal and an output for presenting a signal corresponding to a digitally encoded number equal to the first input signal mathematically divided by the second input signal. An example of a digital divider circuit of the same general type contemplated for use in the invention is described by Montgomery Phister, Jr., *Logical Design of Digital Computers*, pages 316–319.

The output of differentiator 25 is connected to the input of a mathematical squarer circuit 50 whose output is:

$$x^2(\omega_i - \omega_o)^2 \cos^2(\omega_i - \omega_o)t \qquad (11)$$

The output of differentiator 27 is connected to the input of a mathematical squarer circuit 51 whose output is:

$$x^2 (\omega_i - \omega_o)^2 \sin^2 (\omega_i - \omega_o)t \qquad (12)$$

The outputs of mathematical squarer circuits 50 and 51 are connected to inputs of an adder circuit 52 whose output is:

$$x^2 (\omega_i - \omega_o)^2 \qquad (13)$$

The output of adder 52 is connected to the input of an integrator circuit 53 which calculates the average of its input over a certain period of time. The output of integrator 53 corresponds to an estimate of the power times the sum of the mean square power bandwidth and the power mean frequency squared:

$$\overline{P(B^2 + \omega_d{}^2)}$$

The output of integrator 53 is connected to the dividend input of a divider circuit 54 and the output of integrator 33 is connected to the divisor input of divider 54 yielding at its output an estimate of the sum of the mean square power bandwidth and the power mean frequency squared:

$$\overline{B^2 + \omega_d{}^2}$$

The output of divider 44 is connected to the input of a mathematical squarer circuit 55 yielding at its output an estimate of the power mean frequency squared $\overline{\omega_d{}^2}$. The output of divider 54 is connected to the minuend input of subtractor circuit 56 and the output of mathematical squarer 55 is connected to the subtrahend input of adder 56 yielding at its output an estimate of the mean square power bandwidth $\overline{B^2}$.

The output of divider 44, corresponding to an estimate of the power mean frequency, is connected to an input of a comparison circuit 60 which compares the estimated power mean frequency of the input signal to the power mean frequency of the expected signal minus a certain small quantity, for example, 30 hertz or $60\pi$ radians per second, since $\omega = 2\pi f$ where $\omega$ is frequency in radians per second and $f$ is frequency in hertz. The output of comparison circuit 60 has a first output signal present if the estimated power means frequency of the input signal is greater than the value it is compared with, and a second output signal otherwise. The output of divider 44 is also connected to an input of a comparison circuit 61 and the estimated power mean frequency of the input signal is compared to the power mean frequency of the desired signal plus a certain small value, for example, 30 hertz. The output of comparison circuit 61 has a first signal present if the estimated power mean frequency of the input signal is less than the value compared with, and a second signal otherwise.

The output of integrator circuit 33, which corresponds to an estimate of the total power of the input signal, is connected to an input of a comparison circuit 62 and therein compared to a certain value corresponding to the lowest expected total power of the desired signal, for example, 0.9 milliwatts. The output of comparison circuit 62 has a first signal present if the total power of the input signal is greater than the value compared with, and a second signal otherwise. The output of integrator 33 is also connected to an input of a comparison circuit 63 wherein it is compared to the largest acceptable power of the desired signal, for example, 1.1 milliwatts. The output of comparison circuit 63 has a first signal present if the estimated total power is less than the value compared against, and a second signal otherwise.

The output of subtractor 56, corresponding to the estimated mean square power bandwidth of the input signal, is connected to an input of a comparison circuit 64 and therein compared to a value corresponding to the maximum expected mean square power bandwidth of the desired signal for the period of calculation of the estimate, for example, $(150 \text{ hertz})^2$. The output of comparison circuit 64 has a first signal present if the estimate of the mean square power bandwidth is less than the value compared with, and a second signal otherwise.

The outputs of comparison circuits 60, 61, 62, 63, and 64 are connected to corresponding inputs of a decision circuit 65. The output of decision circuit 65 has a first signal present if all of its inputs have a first signal present, and a second signal otherwise. A first signal present on the output of decision circuit 65 indicates the satisfaction of all the conditions and, therefore, the presence of the desired signal.

Figure 3:
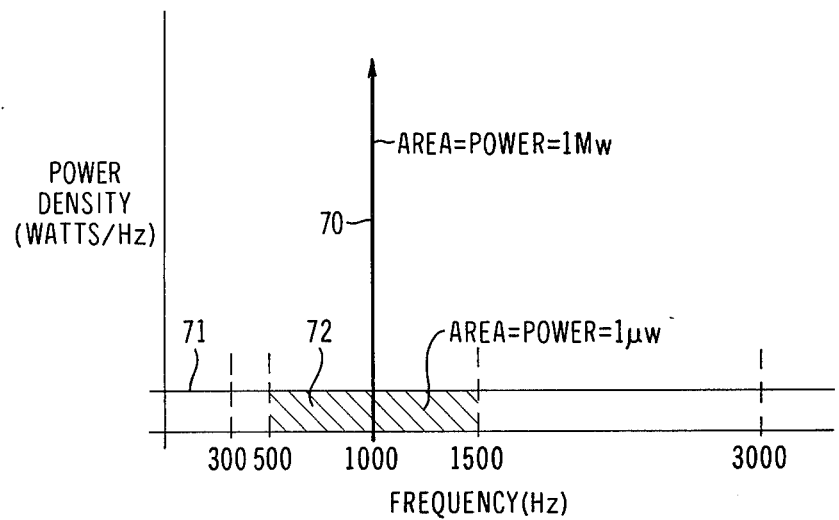
FIG. 3 depicts an exemplary input spectrum for a single tone example.

An illustrative operation of the tone detector circuit may now be considered. FIG. 3 is a diagram of an exemplary input signal spectrum. A signal to be detected 70 is illustrated as an impulse located at 1,000 Hz and having a power density versus frequency area which corresponds to a power of 1 milliwatt. This signal is commonly known as a milliwatt tone in a telephone central office and is used, for example, for testing transmission paths. FIG. 3 also illustrates the presence of a noise signal 71 which is constant across the frequency range shown. The bandpass of the input signal to the tone detector circuit corresponds to a normal telephone voice frequency bandpass of 300–3000 Hz. The effective bandpass of the tone detector circuit, which is a function of low pass filters 24 and 26, is illustrated in FIG. 3 for this example as 500–1500 Hz. The area under the noise signal 72 within the bandpass of the tone detector corresponds, for example, to an area or power of 1 microwatt.

First consider an input signal as shown in FIG. 3 having present both noise and the desired signal. The total power of the input signal within the bandpass of the tone detector is the sum of the signal power and noise power, or 1.01 milliwatts. The total power estimate calculated by power estimation circuit 11 is 1.01 milliwatts plus or minus a standard deviation due to nonideal measurement conditions such as the finite measurement time, which is, with a high degree of certainty, within the limits established by comparison circuit 14 of 0.9 and 1.1 milliwatts and, therefore, results in a positive output from comparison circuit 14. The power mean frequency of the input signal is 1 KHz since the noise is completely symmetrical to the 1 KHz milliwatt tone. Since the reference frequency $\omega_o/2\pi$ of the power mean frequency estimation circuit 12 is also 1 KHz, the output of power mean frequency estimation circuit 12 is zero plus or minus a standard deviation due to measurement inaccuracies, which is, with a high degree of certainty, within the limits of ±30 Hz required by comparison circuit 15, and therefore results in a positive output from comparison circuit 15. The mean square bandwidth $B^2$, which is the square of the standard deviation of the frequency spectrum, would be zero if only the milliwatt tone were present and $B^2$ were calculated over an infinite time period. Since a noise signal is present as shown in FIG. 3, and $B^2$ is calculated over a finite time period, for example, 10 milliseconds, $B^2$ is nonzero. The mean square power bandwidth resulting from the presence of noise $B_n{}^2$ may be calculated by the following formula:

$$B_n^2 = (f_m^2/3) \times (P_n/(P_n + P_s)) \quad (14)$$

where $f_m$ is the bandpass of the tone detector measured from the center frequency to one extreme, $P_n$ is the power due to noise and $P_s$ is the power due to the desired signal. A substitution of the parameters of this example yields $B_n^2 = (9 \text{ Hz})^2$. The average mean square power bandwidth increase due to the finite measurement interval $B_t^2$ may be calculated according to the following formula:

$$B_t^2 = f_m/\pi^2 t \quad (15)$$

where $t$ is the measurement interval in seconds. An insertion of the parameters in this example yields: $B_t^2 = (71 \text{ Hz})^2$.

The actual mean square power bandwidth due to both factors is approximately equal to $(B_n^2 + B_t^2)$ or $(72 \text{ Hz})^2$. The average output of $(72 \text{ Hz})^2$ from mean square power bandwidth estimation circuit 13 is within the limit of $(150 \text{ Hz})^2$ required by comparison circuit 16 which thereby has, with a high degree of certainty, a positive signal present on its output. Decision circuit 17 has positive signals present on all three inputs and, therefore, presents a positive signal on its output indicating the presence of the desired signal.

Next consider an input signal having noise present as in FIG. 3 but a tone signal of 1.2 KHz and a power of 1 milliwatt instead of the desired tone of 1 KHz. The power estimate calculated by circuit 11 and the mean square power bandwidth estimate calculated by circuit 13 would remain the same. However, the power means frequency estimate calculated by circuit 12 would become approximately 1.2 KHz. Since the power of the input tone is much larger than the power of the noise signal, the reduction in the power mean frequency estimate due to nonsymmetrical noise about the tone signal would be negligible. The output signal of circuit 12 would correspond to +200 Hz which would not be within the ±30 Hz required by comparison circuit 15 whose output would therefore be negative. Decision circuit 17 would therefore have two positive and one negative inputs and its output would be negative indicating the absence of the desired milliwatt tone input.

Next, consider the case when only the noise signal is present. The estimated total power of the input signal from power estimation circuit 11 would be approximately 0.01 milliwatts which would not be within the limits of 0.9 and 1.1 milliwatts required by comparison circuit 14 whose output would therefore be negative. The estimated power mean frequency of the input signal at the output of power mean frequency estimation circuit 12 would be 1 KHz since the noise is symmetrical about 1 KHz. The output of estimation circuit 12 would therefore be zero which would be within the limits of ±30 Hz required by comparison circuit 15 whose output would therefore be positive. The mean square power bandwidth of the input signal can be calculated according to Equation 14 by inserting $P_s = 0$; $P_n = 10$ milliwatts; and $f_n = 500$ Hz. According to this calculation, $B^2 = (290 \text{ Hz})^2$ which is not within the limit of $(150 \text{ Hz})^2$ which is required by comparison circuit 16 whose output is therefore negative. Decision circuit 17 has two negative and one positive inputs and therefore has a negative signal present on its output indicating the absence of the desired milliwatt tone signal.

Figure 4:
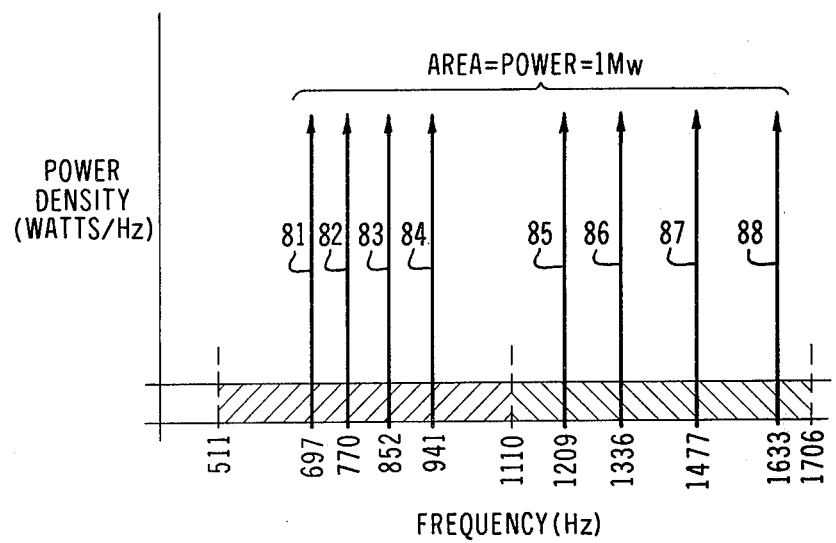
FIG. 4 depicts an exemplary input spectrum for a TOUCH-TONE signal.
Figure 5:
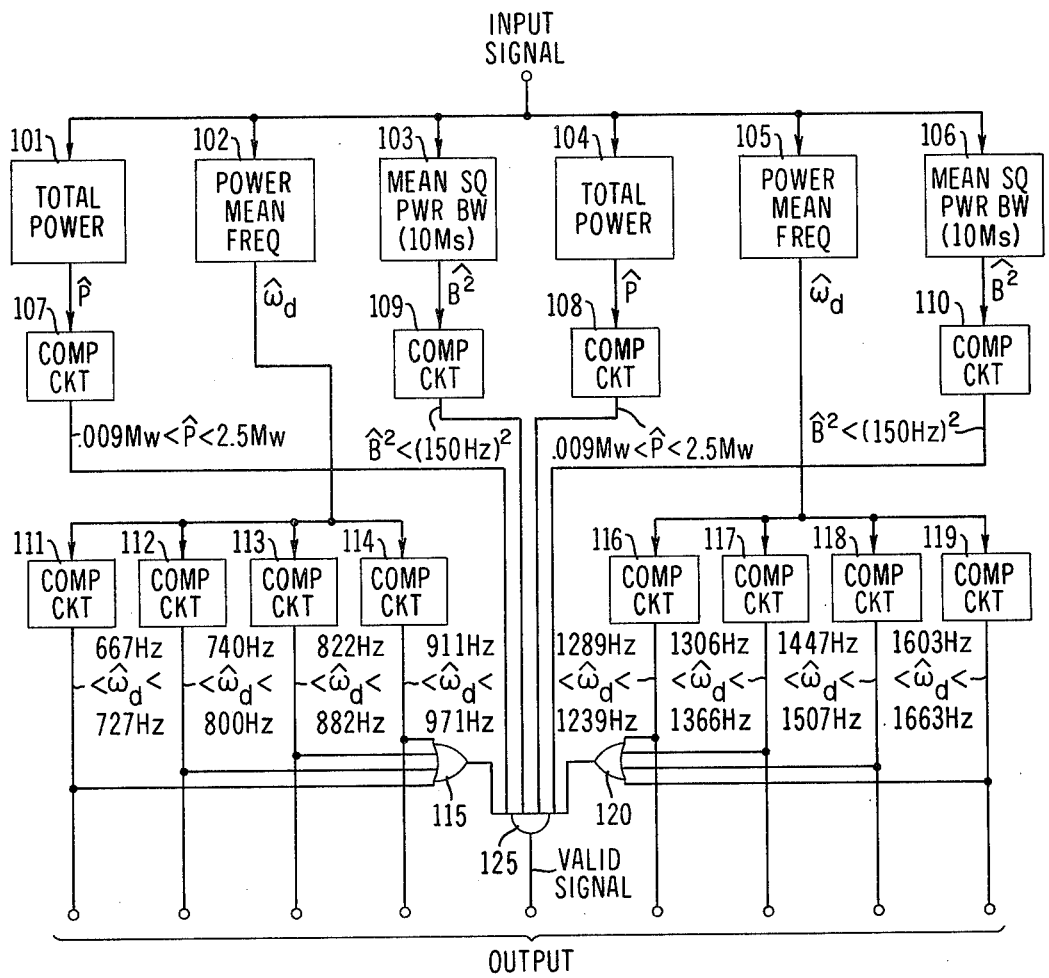
FIG. 5 depicts a TOUCH-TONE detector circuit according to the invention.

Next consider an exemplary use of the invention in a TOUCH-TONE system which uses eight distinct tones separated into a high group and a low group. These tones are shown in FIG. 4 as elements 81–88. A TOUCH-TONE signal comprises a combination of one tone from the low band 81–84 and one tone from the high band 85–88. A circuit according to the invention for detecting TOUCH-TONE signals is shown in FIG. 5. Two sets of estimators are provided, one set for the low band and one set for the high band. The low band estimators 101, 102, and 103 have a reference frequency of 811 hertz and a bandwidth from center to one extreme of approximately 300 hertz which thereby includes all of the low band tones and none of the high band tones. The high band estimators 104, 105, and 106 have a reference frequency of 1406 hertz and a bandwidth from center to one extreme of approximately 300 hertz, thereby including all of the high band tones and none of the low band tones. The decision circuitry is necessary in order to determine whether or not two tones are present which comprise a valid TOUCH-TONE combination, both of which tones have the proper power and bandwidth. Comparision circuits 107 and 108 determine whether or not the signal present in the low band and the signal present in the high band are each within the allowable power limits of 0.009 milliwatts to 2.5 milliwatts. Comparison circuits 109 and 110 determine whether or not the signals present in the low band and high band are within the mean square power bandwidth requirements of $\hat{B^2} < (150 \text{ Hz})^2$. For the purposes of this example, it is assumed that each individual TOUCH-TONE signal has a typical power of 1 milliwatt and that the noise within the bandwidth of the detector has a typical power of 1 microwatt so that the calculations of expected bandwidth for each signal under both ideal and nonideal conditions would be the same as the prior example. The output of low band power mean frequency estimator 102 is connected to an input of each of comparison circuits 111 through 114, each of which compares the power mean frequency estimate of the low band input signal to the power mean frequency of one of the four valid tones for the low band plus or minus 30 hertz which are, respectively, 697 hertz, 770 hertz, 852 hertz, and 941 hertz. The outputs of comparators 111 through 114 comprise four of the set of nine output terminals. The outputs of comparators 111 through 114 are also each connected to an input of "OR" gate 115. The output of gate 115 indicates whether or not a valid signal is present in the low frequency range.

The output of the high band power mean frequency estimator 105 is connected to an input of each of comparison circuits 116 through 119. The outputs of comparators 116 through 119 indicate whether or not the estimated power mean frequency of the high band input signal is equal to the power mean frequency of one of the valid tones plus or minus 30 hertz which are, respectively, 1209 hertz, 1336 hertz, 1477 hertz, and 1633 hertz. The outputs of comparators 116 through 119 comprise four of the set of nine output lines. The outputs of comparators 116 through 119 are each connected to an input of OR gate 120 whose output indicates the presence or absence of a valid tone in the high frequency range. An AND gate 125 has six inputs connected, respectively, to the outputs of comparators 107, 108, 109, 110, OR gate 115, and OR gate 120. The output on AND gate 125 comprises one of the output lines and indicates the presence or absence of a valid TOUCH-TONE signal. A valid TOUCH-TONE signal according to AND gate 125 requires the presence of valid tones in both the high and low band which each meet the total power and bandwidth requirements.

The output of this exemplary tone detector comprises eight lines, each indicating the presence or absence of the eight individual TOUCH-TONE frequencies and a ninth valid signal line which indicates whether or not the information present on the eight-tone indicator output lines is valid. There are many encoded or decoded forms of this information which could be easily implemented by someone skilled in the art, however, this form is one typical representation.

This example illustrates the use of one set of estimator circuits to provide the information necessary to detect a number of different tones within the bandpass of the estimator circuits. Prior TOUCH-TONE detectors require a complete filter-type tone detector for each possible frequency and, therefore, the circuit of the invention represents a considerable savings. It should also be observed that the low band estimator comprising elements 101 through 103 and high band estimator comprising elements 104 through 106 could be implemented using a single set of estimators, time multiplexed between the two bands by providing a different reference frequency for each of the two bands. In order to perform the multiplexing, certain control and memory circuits would be necessary.

Figure 6:
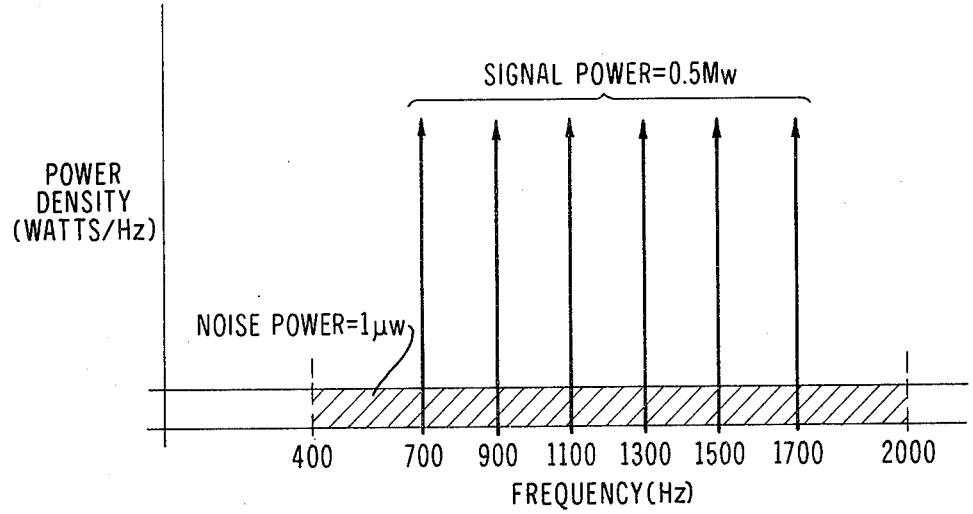
FIG. 6 depicts an exemplary input spectrum for a multi-frequency signal.

Finally, consider an example comprising the use of the invention for the detection of multifrequency signals. A multifrequency signal comprises the combination of any two of six individual tones as shown in FIG. 6. Since these six tones are separated from each other by 200 hertz beginning with the lowest and progressing to the highest and since any two tones comprise a valid signal, it is not possible to use the same approach as used for TOUCH-TONE signals. The circuit shown in FIG. 7 is an example of the application of the invention to the detection of multifrequency tones. A set of estimator circuits 150, 151, 152, and 201 are connected to the input signal for calculating estimates, respectively, of the power mean frequency, total power, guard power, and mean square power bandwidth. The output of power mean frequency estimator 150 is connected to comparator circuits 160 through 168 whose outputs indicate whether or not the estimated power mean frequency of the input signal is substantially equal to one of the nine possible power mean frequencies of valid multifrequency signals as shown in FIG. 7. In order for the input signal to be substantially equal to one of the expected values for comparison circuits 160 through 168, it is necessary that two of the allowed frequencies shown in FIG. 6 be present, that the two frequency components have essentially equal power, and that the noise signal be negligible in comparison to the tone signals.

The output of mean square power bandwidth circuit 152 is connected to an input of each of comparison circuits 170 through 174 which indicate on their outputs whether or not the estimate of the mean square power bandwidth of the input signal is substantially equal to one of the five values of mean square power bandwidth for the valid multifrequency signals as shown in FIG. 7.

The output of total power estimating circuit 151 is connected to the input of comparison circuit 176 which generates an output indicating whether or not the total power of the input signal is within the acceptable limits as shown in FIG. 7.

The output of guard power estimating circuit 201 is connected to the input of comparison circuit 202 which generates an output indicating whether or not the power of the input signal within a predetermined range of frequencies is above or below the threshold value which is determined to be between the maximum expected noise power and minimum expected signal power.

Whether or not one of the 15 valid multifrequency signals is present is indicated by the output of AND gates 180 through 194, respectively. Each of the AND gates 180 through 194 comprises three inputs which are connected to the output of comparison circuit 176, the output of one of the comparator circuits 160 through 168, and the output of one of the comparison circuits 170 through 174. Each of AND gates 190, 192, 193, and 194 have a fourth input connected to the output of comparison circuit 202 which is necessary for the case when a noise signal is present in order to ensure that the noise will not be falsely detected as a valid signal. Each of the AND gates 180 through 194, therefore, requires that an acceptable total power estimate is present, that the estimated guard power is less than a certain level for certain combinations, and that one of the valid combinations of acceptable estimated mean power frequency and estimated mean square power bandwidth of the input signal is present.

The circuit shown in FIG. 7 illustrates the use of the invention for the detection of multiple tone signals. Many other multiple tone signals could be detected using this invention by the construction of similar circuits by one of ordinary skill in the art using the principles taught herein.

It may be observed from the above examples and many others which could also be provided that the comparison of estimates of the first three spectral moments of the input signal with the same parameters of the desired signal results in a powerful and reliable tone signal detection system. Many signals which would erroneously result in a positive output from a conventional analog tone detection system can be detected as erroneous inputs by this invention.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. A tone detector comprising:
    an input terminal for receiving an input signal;
    a plurality of estimating means each comprising:
        an input connected to said input terminal; an output; and
        means for generating at said estimating means output an estimate of a parameter of the frequency spectrum of said input signal;
    one or more decision circuits, each decision circuit comprising:
        a plurality of inputs each connected to a respective one of said plurality of estimating means outputs;
        an output; and
        a plurality of comparison circuits, each comparison circuit corresponding to one of said plurality of estimating means and comprising:

an input connected to the one of said decision circuit inputs connected to the corresponding estimating means;

an output; and means for generating at said comparison circuit output a first signal if the signal present on said input of said comparison means is essentially equal to the value of the corresponding parameter of a tone to be detected and a second signal in the absence of equality; and means for generating at said decision circuit output a third signal if all of said outputs of said plurality of comparison circuits have a first signal present and a fourth signal if one or more of said outputs of said plurality of comparison circuits has a second signal present; and one or more output terminals, each connected to a corresponding decision circuit output for indicating the presence or absence of a predetermined tone whose presence is to be detected.

2. A tone detector according to claim 1 wherein said plurality of estimating means comprises:

a total power estimating means comprising:
an input connected to said input terminal;
an output; and
means for generating at said total power estimating means output an estimate of the total power of said input signal;

a power mean frequency estimating means comprising:
an input connected to said input terminal;
an output; and
means for generating at said power mean frequency estimating means output an estimate of the power mean frequency of said input signal; and a mean square power bandwidth estimating means comprising:
an input connected to said input terminal;
an output; and
means for generating at said mean square power bandwidth estimating means output an estimate of the mean square power bandwidth of said input signal.

3. A tone detector according to claim 2 wherein said plurality of comparison circuits comprises:

a total power comparison circuit comprising:
an input connected to said output of said total power estimating means;
an output; and
means for generating at said total power comparison circuit output a first signal when said output of said total power estimating means is equal within predefined limtis to the total power of a tone or combination of tones to be detected and a second signal in the absence of equality;

a power mean frequency comparison circuit comprising:
an input connected to said output of said power mean frequency estimating means;
an output; and
means for generating at said power mean frequency comparison circuit output a first signal when said output of said power mean frequency estimating means is equal within predefined limits to the power mean frequency of a tone or combination of tones to be detected and a second signal in the absence of equality; and a mean square power bandwidth comparison circuit comprising:
an input connected to said output of said mean square power bandwidth estimating means;
an output; and
means for generating at said mean square power bandwidth comparison circuit output a first signal when said output of said mean square power bandwidth estimating means is equal within predefined limits to the mean square power bandwidth of a tone or combination of tones to be detected and a second signal in the absence of equality.

4. A tone detector according to claim 3 wherein said plurality of estimating means further comprises:

a guard power estimating means comprising:
an input connected to said input terminal;
an output; and
means for generating at said guard power estimating mean output an estimate of the power of said input signal within a predetermined frequency range; and predefined ones of said decision circuit comprising said plurality of comparison circuits further comprises:

a guard power comparison circuit comprising:
an input connected to said output of said guard power estimating means;
an output; and
means for generating at said guard power comparison circuit output a first signal when said output of said guard power estimating means is less than a predefined limit and a second signal when said output of said guard power estimating means is equal to or greater than said predefined limits.

5. A tone detector according to claim 1 wherein said plurality of estimating means comprises:

a first total power estimating means comprising:
an input connected to said input terminal;
an output; and
means for generating at said first total power estimating means output an estimate of the total power of a first set of frequencies of said input signal;

a first power mean frequency estimating means comprising:
an input connected to said input terminal;
an output; and
means for generating at said first power mean frequency estimating means output an estimate of the power mean frequency of a first set of frequencies of said input signal;

a first mean square power bandwidth estimating means comprising:
an input connected to said input terminal;
an output; and
means for generating at said first mean square power bandwidth estimating means output an estimate of the mean square power bandwidth of a first set of frequencies of said input signal;

a second total power estimating means comprising:
an input connected to said input terminal;
an output; and
means for generating at said second total power estimating means output an estimate of the total power of a second set of frequencies of said input signal;

a second power mean frequency estimating means comprising:

an input connected to said input terminal;
an output; and
means for generating at said second power mean frequency estimating means output an estimate of the power mean frequency of a second set of frequencies of said input signal;
a second mean square power bandwidth estimating means comprising:
an input connected to said input terminal;
an output; and
means for generating at said second mean square power bandwidth estimating means output an estimate of the mean square power bandwidth of a second set of frequencies of said input signal.

6. A tone detector comprising:
an input terminal for receiving an input signal;
first means connected to said input terminal for generating output signals defining the total power of signals received from said input terminal and comprising an output terminal;
second means connected to said input terminal for generating output signals defining the power mean frequency of said signals received from said input terminal and comprising an output terminal;
third means connected to said input terminal for generating output signals defining the mean square power bandwidth of said signals received from said input terminal and comprising an output terminal;
a first comparison circuit comprising:
an input connected to said output of said first means;
an output; and
means for generating at said output a first signal when said output of said first means is equal within predefined limits to predefined characteristics of a signal to be detected and a second signal in the absence of equality;
a second comparison circuit comprising:
an input connected to said output of said second means;
an output; and
means for generating at said output said first signal when said output of said second means is equal within predefined limits to predefined characteristics of said signal to be detected and said second signal in the absence of equality;
a third comparison circuit comprising:
an input connected to said output of said third means;
an output; and
means for generating at said output said first signal when said output of said third means is equal within predefined limits to predefined characteristics of said signal to be detected and said second signal in the absence of equality; and
a decision circuit comprising:
first, second, and third inputs connected respectively to said outputs of said first, second, and third comparison circuits;
an output; and
means for generating at said output said first signal when said outputs of said first, second, and third comparison circuits present said first signal and said second signal when said first, second, and third comparison circuits do not all present said first signal.

7. A tone detector comprising:
an input terminal for receiving an input signal of the form
$$x \cos \omega_i t$$
where $\omega$ is the frequency of a tone present in said input signal;
means for generating a reference signal at a frequency $\omega_o$ where $\omega_o$ is the frequency of a tone desired to be detected;
first quadrature component generating means connected to said input terminal for generating output signals defining the Cosine quadrature component $\alpha(t)$ of said input signal according to the relationship
$$\alpha(t) = X \cos(\omega_i - \omega_o)t$$ and comprising an output terminal;
a second quadrature component generating means connected to said input terminal for generating output signals defining the Sine quadrature component $\beta(t)$ of said input signal according to the relationship:
$$\beta(t) = X \sin(\omega_i - \omega_o)t$$
and comprising an output terminal;
a first spectrum parameter estimating means comprising:
a first input connected to said output of said first means for generating quadrature components and a second input connected to said output of said second means for generating quadrature components;
means for generating output signals defining an estimate of the total power $\hat{P}$ of said input signal over a time T according to the relationship:

$$\hat{P} = \frac{1}{T} \int_{-\frac{T}{2}}^{+\frac{T}{2}} (\alpha^2(t) + \beta^2(t))\, dt$$

and an output terminal;
a second spectrum parameter estimating means comprising:
a first input connected to said output of said first means for generating quadrature components and a second input connected to said output of said second means for generating quadrature components;
means for generating output signals defining an estimate of the power mean frequency $\widehat{\omega_d}$ of said input signal over a time T according to the relationship:

$$\widehat{\omega_d} = \frac{1}{\hat{P}T} \int_{-\frac{T}{2}}^{+\frac{T}{2}} [\alpha(t)\dot{\beta}(t) - \beta(t)\dot{\alpha}(t)]\, dt$$

where $\dot{\beta}(t)$ is the first derivative of $\beta(t)$ and $\dot{\alpha}(t)$ is the first derivative of $\alpha(t)$ and an output terminal;
a third spectrum parameter estimating means comprising:
a first input connected to said output of said first means for generating quadrature components and a second input connected to said output of said second means for generating quadrature components;
means for generating output signals defining an estimate of the power bandwidth $\widehat{B^2}$ of said input signal over a time T according to the relationship:

$$\widehat{B^2} = \frac{1}{4\pi^2 T} \int_{-\frac{T}{2}}^{+\frac{T}{2}} [(\dot{\alpha}(t))^2 + (\dot{\beta}(t))^2] dt$$

and an output terminal;
a first comparison circuit comprising:
  an input connected to said output of said first spectrum parameter estimating means;
  an output; and
  means for generating at said output a first signal when said output of said first spectrum parameter estimating means is equal within predefined limits to predefined characteristics of a signal to be detected and a second signal in the absence of equality;
a second comparison circuit comprising:
  an input connected to said output of said second spectrum parameter estimating means;
  an output; and
  means for generating at said output said first signal when said output of said second spectrum parameter estimating means is equal within predefined limits to predefined characteristics of said signal to be detected and said second signal in the absence of equality;
a third comparison circuit comprising:
  an input connected to said output of said third spectrum parameter estimating means;
  an output; and
  means for generating at said output said first signal when said output of said third spectrum parameter estimating means is equal within predefined limits to predefined characteristics of said signal to be detected and said second signal in the absence of equality; and
a decision circuit comprising:
  first, second, and third inputs connected respectively to said outputs of said first, second, and third comparison circuits;
  an output; and
  means for generating at said output a third signal when said outputs of said first, second, and third comparison circuits present said first signal and a fourth signal when said first, second, and third comparison circuits do not all present said first signal.

8. A tone detector comprising:
an input terminal for receiving an input signal;
a local oscillator for generating signals corresponding to the Sine and the Cosine of a predetermined frequency;
a first multiplier circuit comprising:
  a first input connected to said input terminal;
  a second input connected to said Cosine output of said local oscillator;
  an output; and
  means for generating an output signal corresponding to the product of said first and said second inputs and said first multiplier output signal comprising a first component corresponding to the sum of the frequency of said input signal and the frequency of said local oscillator and a second component corresponding to the difference between the frequency of said input signal and the frequency of said local oscillator;
a first low pass filter comprising:
  an input connected to said output of said first multiplier;
  an output; and
  means for removing said component of said first multiplier output signal corresponding to the sum of said input frequency and said local oscillator frequency;
a first differentiator circuit comprising:
  an input connected to said output of said first low pass filter;
  an output; and
  means for generating a signal corresponding to the derivative of said signal present at said input of said first differentiator circuit;
a second multiplier circuit comprising:
a first input connected to said input terminal;
a second input connected to said Sine output of said local oscillator;
an output; and
means for generating an output signal corresponding to the product of said first and said second inputs and said second multiplier output signal comprising a first component corresponding to the sum of the frequency of said input signal and the frequency of said local oscillator and a second component whose frequency corresponds to the difference between the frequency of said input signal and the frequency of said local oscillator;
a second low pass filter comprising:
  an input connected to said output of said second multiplier;
  an output; and
  means for removing said component of said second multiplier output signal corresponding to the sum of said input frequency and said local oscillator frequency;
a second differentiator circuit comprising:
  an input connected to said output of said second low pass filter;
  an output; and
  means for generating a signal corresponding to the derivative of said signal at said input of said second differentiator circuit;
a power frequency product circuit comprising:
  a first input connected to said output of said first differentiator circuit;
  a second input connected to said output of said second low pass filter circuit;
  a third input connected to said output of said first low pass filter;
  a fourth input connected to said output of said second differentiator;
  an output; and
  means for generating an output signal corresponding to the product of the power of said input signal and the difference between the frequency of said input signal and the frequency of said local oscillator signal;
a first integrator comprising:
  an input connected to said output of said power frequency product circuit;
  an output; and
  means for generating a signal at said output of said first integrator corresponding to the average power frequency product over a predetermined period of time;
a power circuit comprising:
  a first input connected to said output of said first low pass filter;
  a second input connected to said output of said second low pass filter;
  an output; and
  means for generating a signal at said output of said power circuit corresponding to the total power of said input signal;
a second integrator comprising:
  an input connected to said output of said power circuit;
  an output; and
  means for generating a signal at said output of said second integrator circuit corresponding to the average total power of said input signal over a predetermined time interval;
a first divider circuit comprising:
  a dividend input connected to said output of said first integrator circuit;
  a divisor input connected to said output of said second integrator circuit;
  an output; and
  means for generating a signal at said first divider output corresponding to said output of said first integrator divided by said output of said second integrator;
a bandwidth circuit comprising:
  a first input connected to said output of said first differentiator;
  a second input connected to said output of said second differentiator;
  an output; and
  means for generating at said output a signal corresponding to an estimate of the total power of said input signal times the sum of the mean square bandwidth of said input signal and the power means frequency squared of said input signal;
a third integrator comprising:
  an input connected to said output of said bandwidth circuit;
  an output; and
  means for generating at said output of said integrator circuit a signal corresponding to the average of said output of said bandwidth circuit over a predetermined time interval;
a second divider circuit comprising:
  a dividend input connected to said output of said third integrator;
  a divisor input connected to said output of said second integrator;
  an output; and
  means for generating at said output of said second divider circuit a signal corresponding to said output of said third integrator divided by said output of said second integrator;
a third multiplier circuit comprising:
  a first input connected to said output of said first divider;
  a second input connected to said output of said first divider;
  an output; and
  means for generating at said output a signal corresponding to the mathematical square of said output of said first divider;
a subtractor circuit comprising:
  a minuend input connected to said output of said second divider circuit;
  a subtrahend input connected to said output of said third multiplier circuit;
  an output; and
  means for generating at said output of said subtractor a signal corresponding to said output of said second divider circuit minus said output of said third multiplier circuit;
a first comparison circuit comprising:
  an input connected to said output of said second integrator circuit;
  an output; and
  means for generating at said output of said first comparison circuit a first signal if said output of said second integrator circuit is within predetermined limits and a second signal if said input of said output of said second integrator circuit is not within predetermined limits;
a second comparison circuit comprising:
  an input connected to said output of said first divider;
  an output; and
  means for generating at said output of said second comparison circuit a first signal if said input of said second comparison circuit is within predetermined limits and a second signal if said input of said second comparison circuit is not within predetermined limits;
a third comparison circuit comprising:
  an input connected to said output of said subtractor;
  an output; and
  means for generating at said output of said third comparison circuit a first signal if said input of said third comparison circuit is within predetermined limits and a second signal if said input of said third comparison circuit is not within predetermined limits;
a decision circuit comprising:
  a first input connected to said input of said first comparison circuit;
  a second input connected to said input of said second comparison circuit;
  a third input connected to said input of said third comparison circuit;
  an output; and
  means for generating at said output of said decision circuit a third signal if said first, said second, and said third decision circuits have a first signal present and a fourth signal if said first, said second, and said third decision circuits do not all have a first signal present; and
  an output terminal connected to said output of said decision circuit.

9. A tone detector according to claim 8 wherein said power circuit comprises:
  a first power multiplier circuit comprising:
    aa first and second input, both connected to said output of said first low pass filter;
    an output; and
    means for generating an output signal corresponding to the product of the signals present on said first and said second inputs;
  a second power multiplier circuit comprising:
    a first and second input, both connected to said output of said second low pass filter;
    an output; and means for generating an output signal corresponding to the product of the signals present on said first and said second inputs; and
a power adder circuit comprising:
a first input connected to said output of said first power multiplier circuit;
a second input connected to said output of said second power multiplier circuit;
an output; and
means for generating an output signal corresponding to the sum of the signals present on said first and said second inputs;
said power frequency product circuit comprises:
a first power frequency product multiplier circuit comprising:
a first input connected to said output of said first differentiator;
a second input connected to said output of said second low pass filter;
an output; and
means for generating an output signal corresponding to the product of the signals present on said first and said second inputs;
a second power frequency product multiplier circuit comprising:
a first input connected to said output of said first low pass filter;
a second input connected to said output of said second differentiator;
an output; and
means for generating an output signal corresponding to the product of the signals present on said first and said second inputs; and
a power frequency product subtractor circuit comprising:
a minuend input connected to said output of said first power frequency product multiplier circuit;
a subtrahend input connected to said output of said second power frequency product multiplier circuit;
an output; and
means for generating an output signal corresponding to the signal present on said minuend input minus the signal on said subtrahend input; and
said bandwidth circuit comprising:
a first bandwidth multiplier circuit comprising:
first and second inputs connected to said output of said first differentiator;
an output; and
means for generating an output signal corresponding to the product of the signals present on said first and said second inputs;
a second bandwidth multiplier circuit comprising:
first and second inputs connected to said output of said second differentiator;
an output; and
means for generating an output signal corresponding to the product of the signals present on said first and said second inputs of said second bandwidth multiplier circuit; and
a bandwidth adder circuit comprising:
a first input connected to said output of said first bandwidth multiplier circuit;
a second input connected to said output of said second bandwidth multiplier circuit;
an output; and
means for generating an output signal corresponding to the sum of the signals present on said first and said second inputs of said bandwidth adder circuit.

* * * * *